Aug. 13, 1968    M. C. IRISH    3,396,493
WORK-SENSING FIXTURE AND CONTROL SYSTEM THEREFOR
Filed Sept. 28, 1964    4 Sheets-Sheet 1
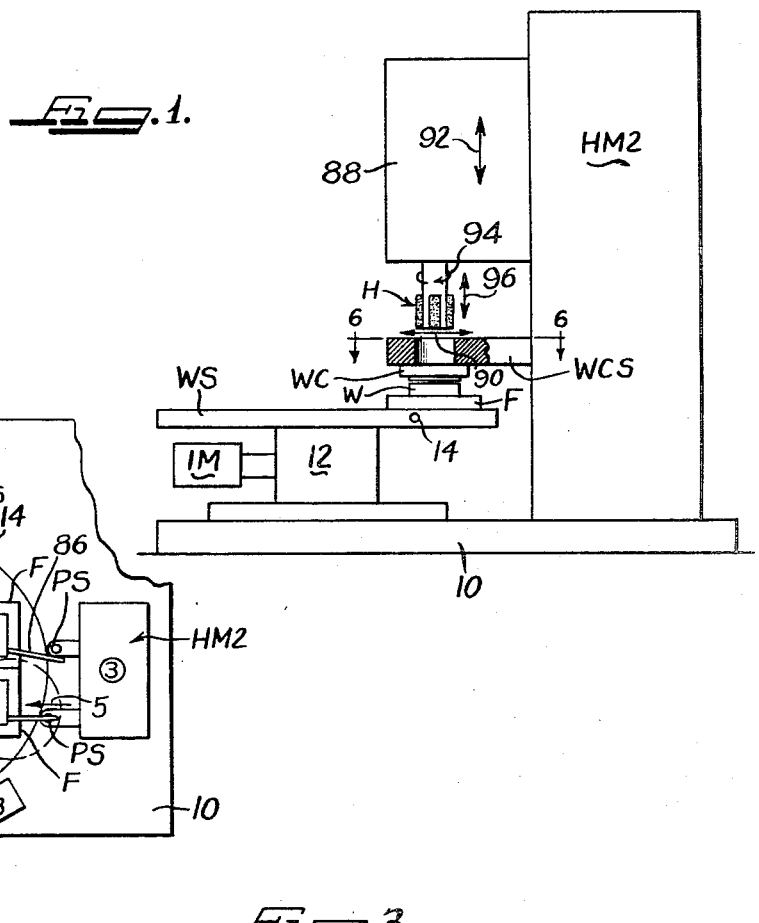
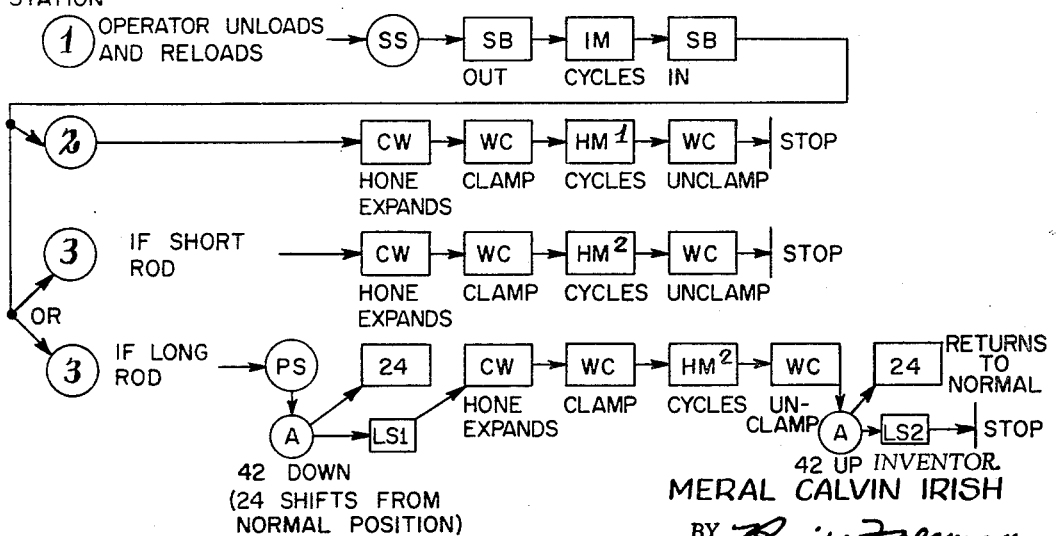
INVENTOR.
MERAL CALVIN IRISH
BY Bair, Freeman
& Molinare Attys.

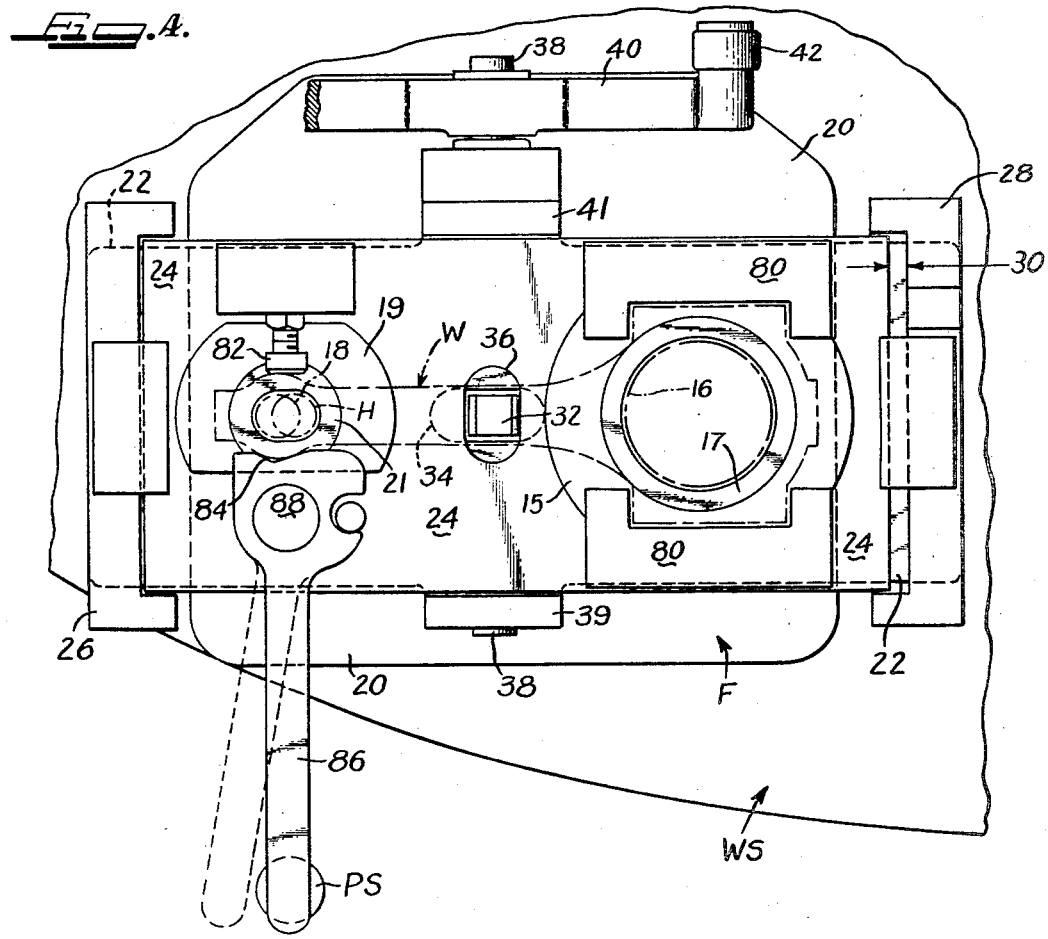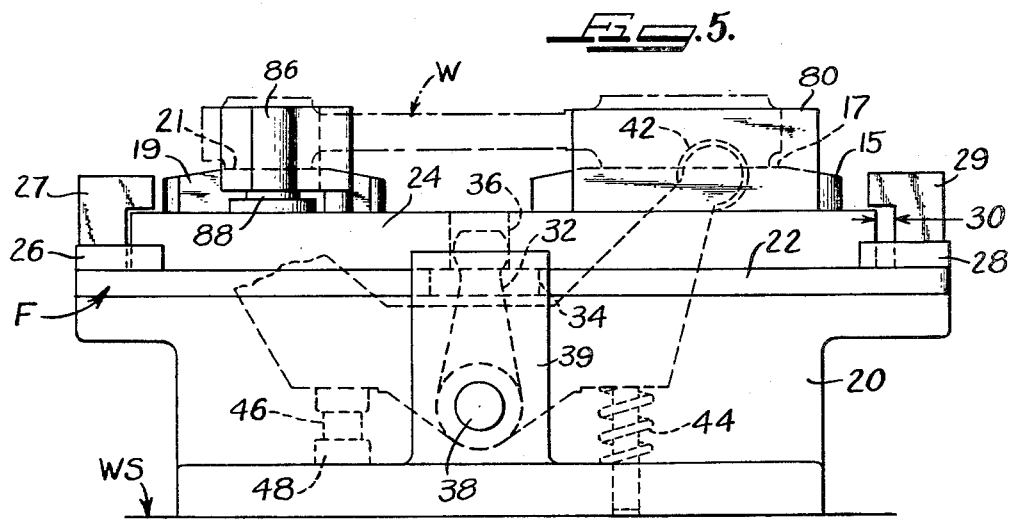

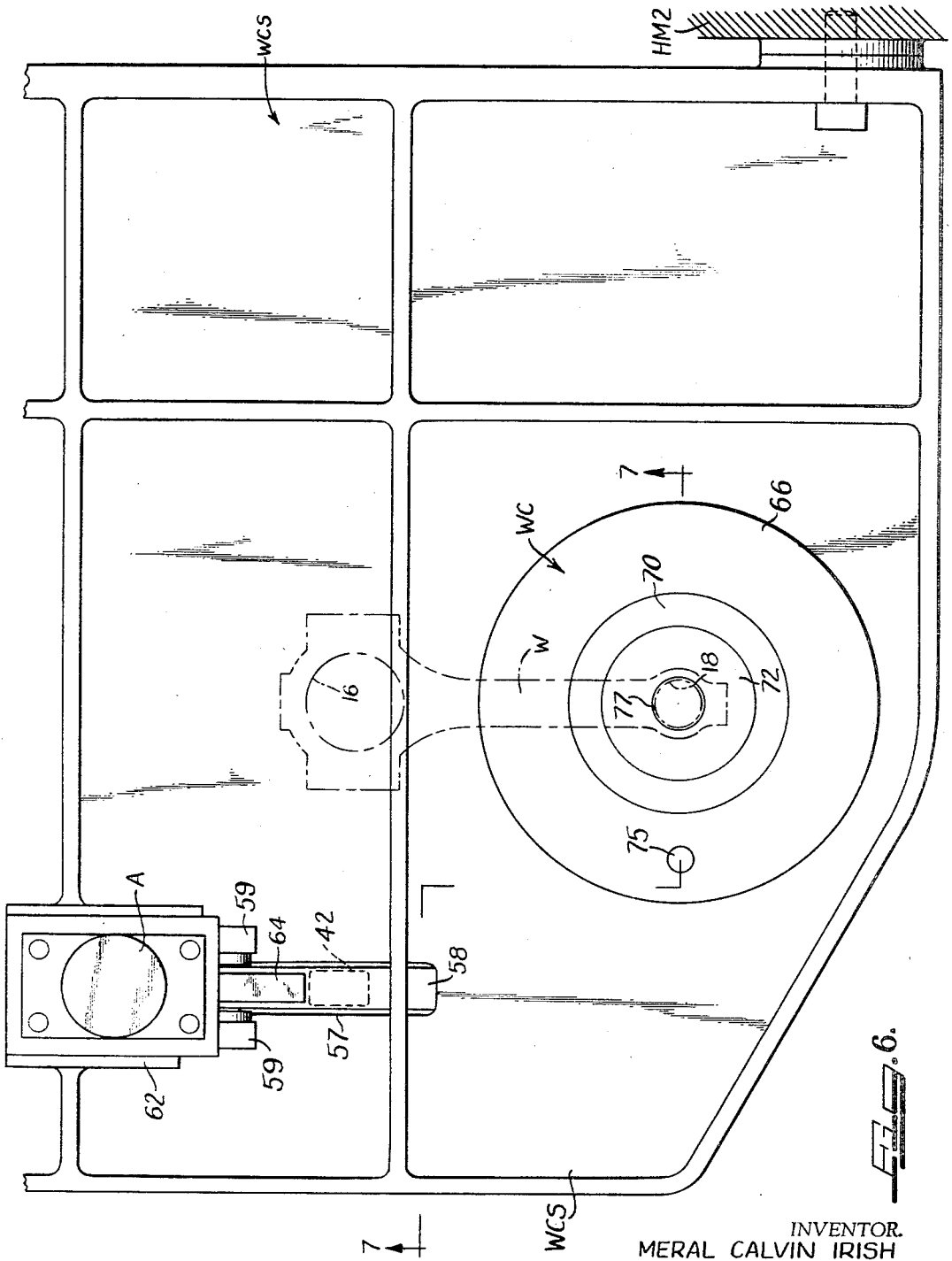

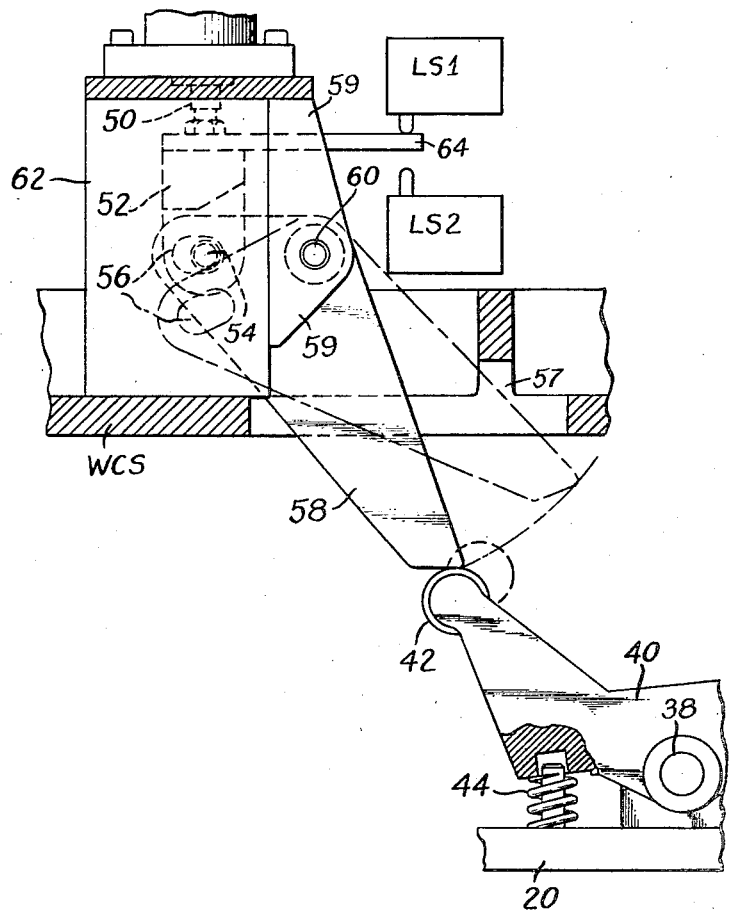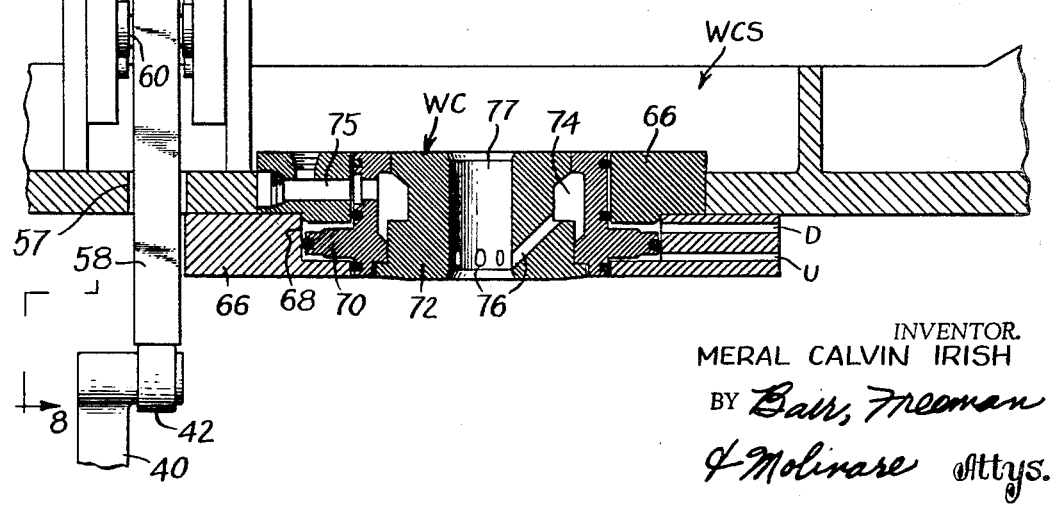

000
United States Patent Office 3,396,493
Patented Aug. 13, 1968

3,396,493
WORK-SENSING FIXTURE AND CONTROL
SYSTEM THEREFOR
Meral Calvin Irish, Richmond, Ind., assignor to National
Automatic Tool Company, a corporation of Indiana
Filed Sept. 28, 1964, Ser. No. 399,584
14 Claims. (Cl. 51—53)

ABSTRACT OF THE DISCLOSURE

A work holding fixture may receive two different character work pieces to be worked on. A control system is operable to complete a work cycle including movement of an out-of-alignment work piece to aligned position with a tool, such movement being the result of operation of a sensing means for the out-of-alignment work piece. The sensing means does not operate if the work piece is in alignment with the tool.

---

This invention relates to a work sensing fixture and a control system therefor wherein random work pieces of different characteristics actuate a control element of the fixture, whereupon the control system operates to sense the control element and to properly position the portion of the work piece to be worked on in relation to tool means which then performs a work operation on the work piece.

One object of the invention is to provide a work sensing fixture and control system which have sensing means cooperable with the work piece and a control element of which assumes one position when cooperating with a work piece of one character, and assumes a different position when cooperating with a work piece of a different character.

Another object is to provide a work sensing fixture and control system wherein the fixture remains in a fixed position relative to a work support when a work piece of one character is received in the fixture, the control system being operable to shift the fixture to another position for a work piece carried by the fixture in the event such work piece is of a different character, whereby work pieces of either character are properly worked upon by the tool means.

A more specific object is to provide a work supporting fixture which remains in a fixed position relative to a work support when a work piece of one length is received in the fixture and wherein the work has a bore properly aligned with a honing means of a honing machine, the control system shifting the fixture to another position for a work piece carried thereby in the event such work piece is of a different length whereby its bore is not in alignment with the honing means, the shift being to a position of proper alignment for the honing operation.

Still another object is to provide a fixture adapted to receive work pieces of two different characters and having a control element positioned differently for the different work pieces wherein one work piece is properly aligned for a machine tool operation thereon whereas the other one is not, the control element of the fixture thereupon coacting with sensing means of a control system which effects shifting of the fixture to another position for proper alignment of the portion of the work piece to be worked on with the tool means before it works thereon.

A further object is to provide an indexable work support having a work piece supporting fixture thereon, a control system being provided for shifting the fixture relative to the work support for a work piece of different character than one which is aligned with the tool means when the work support indexes the work piece to a position adjacent the tool means, the control system thereupon effecting shifting of the fixture for the work piece of different character so that the portion thereof to be worked upon by the tool means is properly aligned therewith.

Still a further object is to provide the control means in the form of a proximity switch actuated by a control element of the fixture when in the position induced by the work piece of different character, the proximity switch effecting shifting of the fixture relative to the work support for proper alignment of the tool means with this particular work piece.

An additional object is to provide work sensing means and a control system therefor which so cooperate with tool means as to permit the tool means to center the work piece whereupon the work piece is clamped, the tool means cycles, the work piece is unclamped, and the tool operating cycle stops when the work piece is of one character.

Another additional object is to provide means which, when the work piece is of a different character, also properly shifts the fixture before centering the work piece and shifts it back after the work piece is unclamped and before the cycle stops.

With these and other objects in view, my invention consists in the construction, arrangement and combination of the various parts of my work sensing fixture and control system therefore, whereby the objects above contemplated are attained, as hereinafter more fully set forth, pointed out in my claims and illustrated in detail on the accompanying drawings, wherein:

FIG. 1 is a diagrammatic side elevation of my work sensing fixture in association with an indexable table and a pair of machine tools;

FIG. 2 is a diagrammatic plan view thereof showing a loading station (1) and a pair of machine tools at stations (2) and (3);

FIG. 3 is an operation diagram involving all three stations and the events that occur in sequence, and as a result of operation of the work sensing fixture and the control system therefor at station (3);

FIG. 4 is a plan view of one of the work sensing fixtures (the one shown in the dot-and-dash line circle 4 of FIG. 2);

FIG. 5 is a front elevation thereof looking in the direction of the arrow 5 of FIG. 2;

FIG. 6 is a plan view of a work clamp support and associated mechanism as taken on the indicating line 6—6 of FIG. 1;

FIG. 7 is a vertical sectional view on the line 7—7 of FIG. 6, and

FIG. 8 is a partly sectioned view on the line 8—8 of FIG. 7.

On the accompanying drawings I have used the following symbols to indicate machines, machine elements or mechanisms and one machine operation (centering work):

A—Air Cylinder
CW—Centering Work
F—Fixture
H—Hone
HM—Honing Machine
IM—Indexing Mechanism
PS—Proximity Switch
SB—Shot Bolt
SS—Starting Switch
W—Work Piece
WC—Work Clamp
WCS—Work Clamp Support
WS—Work Support Referring to the diagrammatic FIGURES 1 and 2, a common base 10 is illustrated on which a pair of honing machines HM1 and HM2 are mounted at stations (2) and (3), respectively, as well as the indexing mechanism IM. The work support WS is in the form of an indexable table mounted for rotation on a post 12 and indexed by the indexing mechanism IM, it being shown locked in position against indexing by the shot bolt SB in FIG. 2, the table having three index holes 14 for this purpose to receive the shot bolt.

Six of the work piece supporting fixtures F are provided for the loading of two work pieces W thereon at station (1), the honing of one bore in each work piece at station (2) by the honing machine HM1 and the honing of a second bore in each work piece W at station (3) by the honing machine HM2.

As shown in FIG. 1 the work piece W is supported on the fixture F, and above it the work clamp WC is supported by the work clamp support WCS. The work clamp is adapted to press downwardly relative to the work clamp support WCS thereby clamping the work W against the fixture F which in turn is supported by the work support WS. After clamping, a honing operation is performed by the hone H of the honing machine HM2. Details of the work clamp support and the work clamp are shown in FIGS. 6, 7 and 8 and are of the general character shown in the Hunt and Irish Patent No. 3,289,356 wherein will be found a full disclosure of work locating means (centering the work with relation to the hone) and an operating cycle therefor and for the work clamp WC.

As to further details of the fixture F, reference is made to FIGS. 4 and 5 wherein the work piece W is illustrated as a connecting rod having a large crank pin bore 16 to be honed at one end and a small wrist pin bore 18 to be honed at the other end. The fixture F comprises a base 20 secured to the work support WS and having a supporting plate 22 which is rectangular in plan view and is provided for a connecting rod supporting plate 24 floatingly mounted thereon as by the introduction of fluid between adjacent faces thereof as disclosed in the above mentioned patent.

Referring to FIG. 4, it will be noted that the supporting plate 22 is provided with guide brackets 26 and 28 having a few thousandths clearance along the sides of the connecting rod supporting plate 24 and considerable clearance as indicated at 30 between one end of the plate and the bracket 28. Further brackets 27 and 29 are mounted on the brackets 26 and 28, respectively, to confine the supporting plate 24. When the connecting rod is loaded into the fixture, its large end is approximately located by U-shaped locators 80 and the small end is engaged with a locator button 82 opposed to a V seat 84 in a control arm 86 pivoted at 88 to the supporting plate 24. In FIG. 4 the arm is shown solid for a long connecting rod and dotted for a short connecting rod. In relation to a proximity switch PS (see also FIG. 2) fixed in relation to the honing machine HM2 at station (3), the arm in the solid line (long rod) position will actuate the proximity switch but in the dotted line (short rod) position will not actuate it. The purpose of the control arm and proximity switch will appear hereinafter.

The purpose of the clearance 30 is so that the plate 24 can be shifted to the right in FIG. 4 to substantially take up the clearance 30 whereupon there would be similar clearance between the left-hand end of the plate 24 and the guide bracket 26. To accomplish this shifting movement a lever 32 (FIG. 5) extends upwardly through a slot 34 in the plate 22 and into a slot 36 of the plate 24, the lower end of the lever being mounted on a rock shaft 38 journaled in bearings 39 and 41. An arm 40 is also mounted on the rock shaft and carries a roller 42. The arm 40 is normally tilted to the position shown in FIG. 5 under the bias of a spring 44 at which time a stop 46 on the arm engages a stationary stop 48 on the fixture base 20.

It will now be obvious that downward movement of the roller 42 against the bias of the spring 44 will swing the lever 32 toward the right in FIG. 5 thus shifting the connecting rod supporting plate 24 to the right or backward with respect to the clockwise direction (arrow 89 in FIG. 2) of rotation of the table WS, whereas release of pressure on the roller 42 will permit the spring 44 to return the plate 24 to the forward or normal position shown.

For actuating the roller 42 as just described, reference is made to FIGS. 6, 7 and 8 wherein the air cylinder A has a piston rod 50 terminating in a fork 52 carrying a pin 54 which coacts with a slot 56 of a bell crank 58 pivoted at 60 in brackets 59. The air cylinder A is supported by a U-shaped bracket 62 mounted on the work clamp support WCS which in turn is supported by the honing machine HM2 as shown in FIG. 1. Thus the work support WS, the fixture F and the work W may rotate under the work clamp support WCS and the work clamp WC. The air cylinder A, when actuated to move the piston rod 50 downwardly, moves the bell crank 58 from the dotted position shown in FIG. 8 to the full line position. The piston rod 50 is provided with a limit switch actuating arm 64 for actuating the limit switches LS1 and LS2 for a purpose which will hereinafter appear.

With respect to details of the work clamp WC, it comprises (see FIG. 7) a cylinder plate 66 having a cylinder bore 68 in which a disc-like piston 70 is vertically reciprocable. A work engaging sleeve 72 is carried by the piston 70 and suitable O-ring seals are provided whereby the supply of fluid pressure to an up port U will raise the piston in the cylinder, whereas supply thereof to the down port D will lower the piston and the work engaging sleeve 72 so that the sleeve engages the work W and tightly clamps it in position against the supporting plate 24. The supporting plate is provided with suitable seat blocks 15 and 19 having hardened faces 17 and 21, respectively, against which the connecting rod (work W) is positioned.

The hone H is of the type which is expansible from one diameter that permits it to pass through the bore of the work engaging sleeve 72 to a larger diameter that engages the bore in the work and which, since the connecting rod supporting plate 24 is floatingly mounted on the supporting plate 22, will automatically center the work (operation CW) before the hone begins to rotate and reciprocate. After the centering operation, the work is clamped by introducing fluid pressure into the down port D of the work clamp. The honing machine can then be cycled followed by an unclamping operation, the entire cycle of automatic operation being fully disclosed in the Hunt and Irish patent referred to.

FIG. 7 also illustrates an annular passageway 74 communicating with fluid passageways 76 to supply cutting fluid to the tool during operation. Such cutting fluid is introduced at a feed passageway 75 which communicates with the annular passageway 74.

Referring to FIG. 3, a complete cycle of operations is diagrammed. The operator (indicated 78 in FIG. 2) at station (1) unloads and reloads the fixtures F with the work W (such as connecting rods as shown in FIGS. 4, 5 and 6). He then presses the starting switch SS which causes the shot bolt SB to be pulled "OUT" whereupon the indexing mechanism IM "CYCLES" and the shot bolt is pushed "IN" again at the next opening 14, all as indicated for station (1).

As soon as the shot bolt has been moved in again an operating cycle occurs at station (2) and simultaneously therewith an operating cycle occurs at station (3).

At station (2) the two large bores 16 of the connecting rods are honed by the honing machine HM1 which has a hone for each of the two rods. First the hone H expands for centering the work as indicated CW. Expansion takes place after the hone has been moved into the bore as described in the Hunt and Irish patent followed sequentially by the work clamp WC clamping, the honing machine HM1 cycling, the work clamp WC unclamping, and the honing machine HM1 stopping after withdrawal of the hone H from the bore 16. Cycling of the honing machine after expansion (represented by the arrow 90 in FIG. 1) consists of reciprocating (arrow 96) and rotating (arrow 94) the hone carrier and hone H, and then the head 88 (movable as per arrow 92) moves up to the position shown, a cycle of this character being shown and described in the Marker et al. Patent No. 3,126,673.

At station (3) the small bores 18 of the two connecting rods are honed, there of course being one hone for each on the honing machine HM2. If one connecting rod is short and the other long, the bore 18 of the short one can be honed in the same type of cycle diagrammed for station (2), which has just been described.

If the connecting rod W is long, however, such as shown in FIG. 4 (the position of the hone being indicated at H), it is necessary to shift the connecting rod supporting plate 24 toward the right to align the bore 18 with the hone, and this must be done before centering the work. To accomplish this shift, the control arm 86 and the proximity switch PS cooperate to effect operation of the air cylinder A which moves the roller 42 downwardly by reason of moving the bell crank 58 from the dotted line position to the full line position shown in FIG. 8, thus shifting the plate 24 to the right for positioning the bore 18 (aligning it with the hone H in FIG. 4). The upper work piece W at station (3) in FIG. 2 is a short rod and therefore its proximity switch is not actuated while the lower work piece W is a long rod and the control arm 86 is in position to actuate its respective proximity switch.

The "long rod" operation at station (3), as shown in FIG. 3, results in actuation of the air cylinder A so that its piston rod 50 moves upwardly so the roller 42 downward and this shifts the plate 24 to the right and also actuates the limit switch LS1 to start the work centering operation. Thereupon the work clamp is clamped, the honing machine HM2 cycles, and the work clamp is unclamped as at stations (2) and (3), but the unclamping operation results in actuation of the air cylinder A for swinging the bell crank 58 counterclockwise in FIG. 8, so that the roller 42 is lifted by the spring 44, and the connecting rod supporting plate 24 thereby returns to normal position so that it is ready for the next honing operation at station (2) by the honing machine HM1. The limit switch LS2 is also actuated at completion of the shift for stopping the cycle.

Thus the long rod operation differs from the short rod operation in the additional steps of shifting the plate 24 before the normal honing cycle and returning it thereafter to its normal position. Without going into the details of electrical, pneumatic and/or hydraulic circuits, the sequence of operation has been disclosed and the usual solenoid valves would be actuated by the electric circuit controlled by the proximity switch. Circuitry of this kind is standard equipment in the machine tool art and need not be gone into in detail. The cylinder A may, of course, be designed for hydraulic rather than pneumatic operation.

From the foregoing specification it will be obvious that I have provided a work sensing fixture and control system which effect proper work operations on different random-loaded work pieces, the fixture and circuit cooperating to sense the difference and effecting adjustment of the fixture accordingly. Connecting rods have been shown as the work merely by way of example, and the honing machine HM1 at station (2) does not require operation of the sensing feature as the large end of the rod is always correctly positioned when the connecting rod supporting plate 24 is in its normal position. At station (3), however, either a long rod or a short rod may be encountered at either of the two honing heads on the honing machine HM2, one being shown long and the other short in FIG. 2, whereas at station (1) both short rods are illustrated and at station (2) both long rods merely by way of illustration. At station (3), as illustrated in FIG. 2, both types of cycles may be required. In FIG. 3, both types are diagrammed on the basis of either a "SHORT ROD," or a "LONG ROD." The double-hone machine at each station (2) and (3), and two fixtures and work pieces at each of the three positions on the work support WS are for the purpose of maximum production as the operator 78 can unload and reload with each hand, then press the starting switch SS and unload and reload again after the next shot bolt "IN" operation and while the cycles at stations (2) and (3) are taking place.

Some changes may be made in the construction and arrangement of the parts of my work sensing fixture and in the control system therefor without departing from the real spirit and purpose of my invention. Accordingly, it is my intention to cover by my claims any modified forms of structure or use of mechanical equivalents which may reasonably be included within their scope.

I claim as my invention:

1. In a work sensing fixture and control system therefor, tool means, a work support, a fixture mounted thereon for receiving a work piece having a portion to be worked on by said tool means wherein said portion of some work pieces are in alignment and others out of alignment with said tool means, said fixture having a normal position relative to said work support when said portion to be worked on is in alignment with said tool means, means to sense said portion to be worked on when out of alignment with said tool means, and means actuated by said sensing means to move said fixture relative to said work support to align such out-of-alignment portion to be worked on with said tool means.

2. A work sensing fixture and control system therefor according to claim 1 wherein said work support comprises an indexable table, indexing mechanism therefor, a shot bolt to retain said table in indexed position, and means to initiate an operating cycle which results in said shot bolt being withdrawn, sequentially followed by operation of said indexing mechanism, return of said shot bolt to retaining position, a tool operation by said tool means on said portion to be worked on if said sensing means is not actuated, and stoppage of the cycle.

3. A work sensing fixture and control system therefor according to claim 1 wherein means is provided to initiate an operating cycle which results in a tool operation by said tool means on said portion to be worked on if said sensing means is not actuated, and stoppage of the cycle.

4. A work sensing fixture and control system therefor according to claim 1 wherein said work support comprises an indexable table, indexing mechanism therefor, a shot bolt to retain said table in indexed position, and means to initiate an operating cycle which results in said shot bolt being withdrawn, sequentially followed by operation of said indexing mechanism, return of said shot bolt to retaining position, movement of said fixture relative to said work support if said sensing means is actuated, a tool operation by said tool means on said portion to be worked on, return of said fixture to its normal position relative to said work support, and stoppage of the cycle.

5. A work sensing fixture and control system therefor according to claim 1 wherein means is provided to initiate an operating cycle which results in movement of said fixture relative to said work support if said sensing means is actuated, a tool operation by said tool means on said portion to be worked on, return to said fixture to its normal position relative to said work support, and stoppage of the cycle.

6. A work sensing fixture and control system therefor according to claim 1 wherein the work pieces have bores, said tool means is honing means for the bores, a work clamp is provided for the work pieces, said fixture is floatingly mounted relative to said work support and has means to approximately center the work piece when placed thereon, said honing means is operable to center the bores of the work pieces before said work clamp is actuated, and means is provided to initiate an operating cycle which results in said honing means centering the bore of a work piece by moving said fixture relative to said work support, sequentially followed by a honing operation by said honing means on said bore if said sensing means is not actuated, and stoppage of the cycle.

7. A work sensing fixture and control system therefor according to claim 1 wherein a work clamp is provided for the work pieces, said fixture is floatingly mounted relative to said work support and has means to approximately center the work piece when placed thereon, said tool means is operative to align said portion of the work piece to be worked on before said work clamp is actuated, and means is provided to initiate an opening cycle which results in said tool means aligning the work piece by moving said fixture relative to said support, sequentially followed by a tool operation by said tool means on said portion to be worked on if said sensing means is not actuated, and stoppage of the cycle.

8. A work sensing fixture and control system therefor according to claim 1 wherein the work pieces have bores, said tool means is honing means for the bores, a work clamp is provided for the work pieces, said fixture is floatingly mounted relative to said work support and has means to approximately center the work piece when placed thereon, said honing means is operative to center the bores of the work pieces before said work clamp is actuated, and means is provided to initiate an operating cycle which results in said honing means centering the bore of a work piece by moving said fixture relative to said work support, sequentially followed by movement of said fixture relative to said work support if said sensing means is actuated, a honing operation by said honing means on said bore, return of said fixture to its normal position relative to said work support, and stoppage of the cycle.

9. A work sensing fixture and control system therefor according to claim 1 wherein a work clamp is provided for the work pieces, said fixture is floatingly mounted relative to said work support, said tool means is operative to align said portion of the work piece to be worked on before said work clamp is actuated, and means is provided to initiate an operating cycle which results in movement of said fixture relative to said work support if said sensing means is actuated, sequentially followed by said honing means centering the bore of a work piece by moving said fixture relative to said work support, a honing operation by said honing means on said bore, return of said fixture to its normal position relative to said work support, and stoppage of the cycle.

10. In a work sensing fixture and control system therefor, honing means, a work support, a fixture mounted thereon for receiving a work piece having a bore to be honed by said honing means wherein said bores of some work pieces are in alignment and others out of alignment with said honing means, said fixture having a normal position relative to said work support when a bore is in alignment with said honing means, means to sense a bore out of alignment, a switch actuated by said last means only when sensing a bore out of alignment, and means actuated by said switch to effect movement of said fixture relative to said work support to align such out-of-alignment bore with said honing means.

11. A work sensing fixture and control system therefor according to claim 10 wherein said work support comprises an indexable table, indexing mechanism therefor, a shot bolt to retain said table in indexed position, and means to initiate an operating cycle which results in said shot bolt being withdrawn, sequentially followed by operation of said indexing mechanism, return of said shot bolt to retaining position, a honing operation by said honing means on said bore if said switch is not actuated, and stoppage of the cycle.

12. A work sensing fixture and control system therefor according to claim 10 wherein said work support comprises an indexable table, indexing mechanism therefor, a shot bolt to retain said table in indexed position, and means to initiate an operating cycle which results in said shot bolt being withdrawn, sequentially followed by operation of said indexing mechanism, return of said shot bolt to retaining position, movement of said fixture relative to said work support if said switch is actuated, a honing operation by said honing means on said bore, return of said fixture to its normal position relative to said work support, and stoppage of the cycle.

13. A work sensing fixture and control system therefor according to claim 10 wherein the work pieces have bores, said fixture has means to approximately center the work piece when placed thereon, said tool means is honing means for the bores, a work clamp is provided for the work pieces, said fixture is floatingly mounted relative to said work support, said honing means is operative to center the bore of the work piece before said work clamp is actuated, and means is provided to initiate an operating cycle which results in said honing means centering the bore of a work piece by moving said fixture relative to said work support, sequentially followed by a honing operation by said honing means on said bore if said switch is not actuated, and stoppage of the cycle.

14. A work sensing fixture and control system therefor according to claim 10 wherein the work pieces have bores, said tool means is honing means for the bores and work clamp is provided for the work pieces, said fixture is floatingly mounted relative to said work support and has means to approximately center the work piece when placed thereon, said honing means is operative to center the bore of the work piece before said work clamp is actuated, and means is provided to initiate an operating cycle which results in said honing means centering the bore of a work piece by moving said fixture relative to said work support, sequentially followed by movement of said fixture relative to said work support if said switch is actuated, a honing operation by said honing means on said bore, return of said fixture to its normal position relative to said work support, and stoppage of the cycle.

References Cited

UNITED STATES PATENTS

| | | | |
|---|---|---|---|
| 2,355,468 | 8/1944 | Robb | 72—10 X |
| 3,116,665 | 1/1964 | Reisner | 90—13.05 |

FOREIGN PATENTS

| | | |
|---|---|---|
| 512,297 | 8/1939 | Great Britain. |

DONALD R. SCHRAN, *Primary Examiner.*